(12) United States Patent
MacLeod et al.

(10) Patent No.: US 6,658,647 B1
(45) Date of Patent: Dec. 2, 2003

(54) ACCESS TO RESOURCE FILES STORED IN ROM

(75) Inventors: Carolyn Ruth MacLeod, Raleigh, NC (US); Patrick James Mueller, Apex, NC (US); Philip Charles Rubesin, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/373,400

(22) Filed: Aug. 12, 1999

(30) Foreign Application Priority Data

Mar. 30, 1999 (CA) ............................................. 2267539

(51) Int. Cl.[7] .............................. G06F 9/44; G06F 9/00
(52) U.S. Cl. ....................... 717/118; 717/116; 709/331; 709/332
(58) Field of Search ................................. 717/116, 118, 717/162, 165, 167, 114, 148, 166, 146, 170; 707/205, 530; 709/330–332; 712/34

(56) References Cited

U.S. PATENT DOCUMENTS

| 5,421,016 A | * | 5/1995 | Conner et al. ............... 717/146 |
| 5,481,713 A | * | 1/1996 | Wetmore et al. ............. 717/170 |
| 5,815,718 A | * | 9/1998 | Tock ........................... 717/166 |
| 5,966,542 A | * | 10/1999 | Tock ........................... 717/166 |
| 6,330,659 B1 | * | 12/2001 | Poff et al. ...................... 712/34 |

* cited by examiner

*Primary Examiner*—Hoang-Vu Antony Nguyen-Ba
(74) *Attorney, Agent, or Firm*—Gregory M. Doudnikoff

(57) ABSTRACT

A system for accessing resources, such as bitmaps, fonts and sound files is provided. Typically, resources of this type are accessed as files from Java code. The data is read into dynamic (RAM) memory as a byte array in a Java object, and at least one other copy of the byte array is made in order to process the resource data, such as rendering an image to a display. The invention provides a mechanism for accessing the resource data directly from ROM, without making intermediate copies in RAM. Each resource can have a unique key or string in a logical table. Values associated with the keys are pointers to the data stored in ROM. The pointers are passed directly to the methods for processing the data on the hardware, bypassing the need to have the data become a temporary Java object. The saving in memory use is particularly advantageous for constrained memory devices. Applications developed for environments using traditional file access can be ported to a ROM-access environment by including a global switch redirecting resource calls to the logical table(s) containing the keys.

7 Claims, 3 Drawing Sheets

ACCESS TO RESOURCE FILES STORED IN ROM

BACKGROUND OF THE INVENTION

1. Field of the Invention

The present invention is directed to the storage of resources, such as images, bitmaps and sound files, in environments with constrained memory resources, such as embedded devices. The invention provides a means for accessing such resources during runtime where the resources are stored in read-only memory (ROM).

2. Description of the Related Art

Embedded devices, such as cellular telephones, pagers and PDAs (personal digital assistants), typically include complex user interfaces, aural signals and other features to perform the consumer function(s) for which the devices were designed.

The necessary resources are usually in the form of pre-constructed data files, containing bitmaps, fonts or sound recordings. The program accesses the data in one or more resource files to render the user interface on the device display or produce the sound from the device audio system.

The problem is how to store resources such as images, bitmaps, sound files, etc., and access them from running programs, such as Java™ [1] applications. On a desktop, the simple approach is to use a flash file system and treat these resources just like normal files which are copied to random access memory (RAM) when accessed by the running program.

[1] Javva is a trademark of Sun Microsystems, Inc.

However, this approach is not appropriate for embedded systems for two reasons. First, complex bitmap images can be very large—sometimes tens of thousands of bytes in length. Copying these to RAM for rendering on a display greatly increases the consumption of memory. Embedded devices typically have memory of only 1 to 4 megabytes, so an increase in the use of RAM to access resources, particularly to reproduce large bitmap images, impacts the number and complexity of applications that can be stored and run on the device.

Secondly, many embedded systems have only a thin realtime operating system (RTOS), or none at all. Often no file system is included.

SUMMARY OF THE INVENTION

Therefore, it is an object of the present invention to provide a means by which resource data can be stored in ROM without the use of a file system, and accessed in ROM storage from a running program.

It is also an object of the invention to provide portability, so that an application used in a less constrained memory environment, such as a desktop operating system, can be used on an embedded platform without changing the application code.

According to these and other objects, the present invention provides a system for processing resource data directly from a location in read-only memory which includes at least one logical table containing a key for a program call for a resource, and associating the key with a value identifying the location in read-only memory of the resource data. The system also includes a mechanism for redirecting calls to the resource data to the at least one logical table. Preferably, the value is a pointer to the location in read-only memory of the resource data and the key is a string.

The present invention also provides a method for processing resource data directly from a location in read-only memory. On start-up of the system, an array of key-value pairs is generated in which the key in a pair is associated with a named resource and the corresponding value in the pair is information for accessing the resource data at the location in read-only memory. On start-up of a program in said system, a global switch is engaged which directs program calls for resources to the array.

BRIEF DESCRIPTION OF THE DRAWINGS

Embodiments of the invention will now be described in detail in association with the accompanying drawings, in which.

DESCRIPTION OF THE PREFERRED EMBODIMENTS

Java is an interpreted object-oriented programming language. Normally a Java application is deployed from a number of class files on disk and a number of bitmaps in directories related to the class files. Under conventional technology, a JAR file can be built which takes the whole directory tree of classes and resources. Conceptually the approaches are the same—the JAR file is simply a container for all required files.

Figure 1:
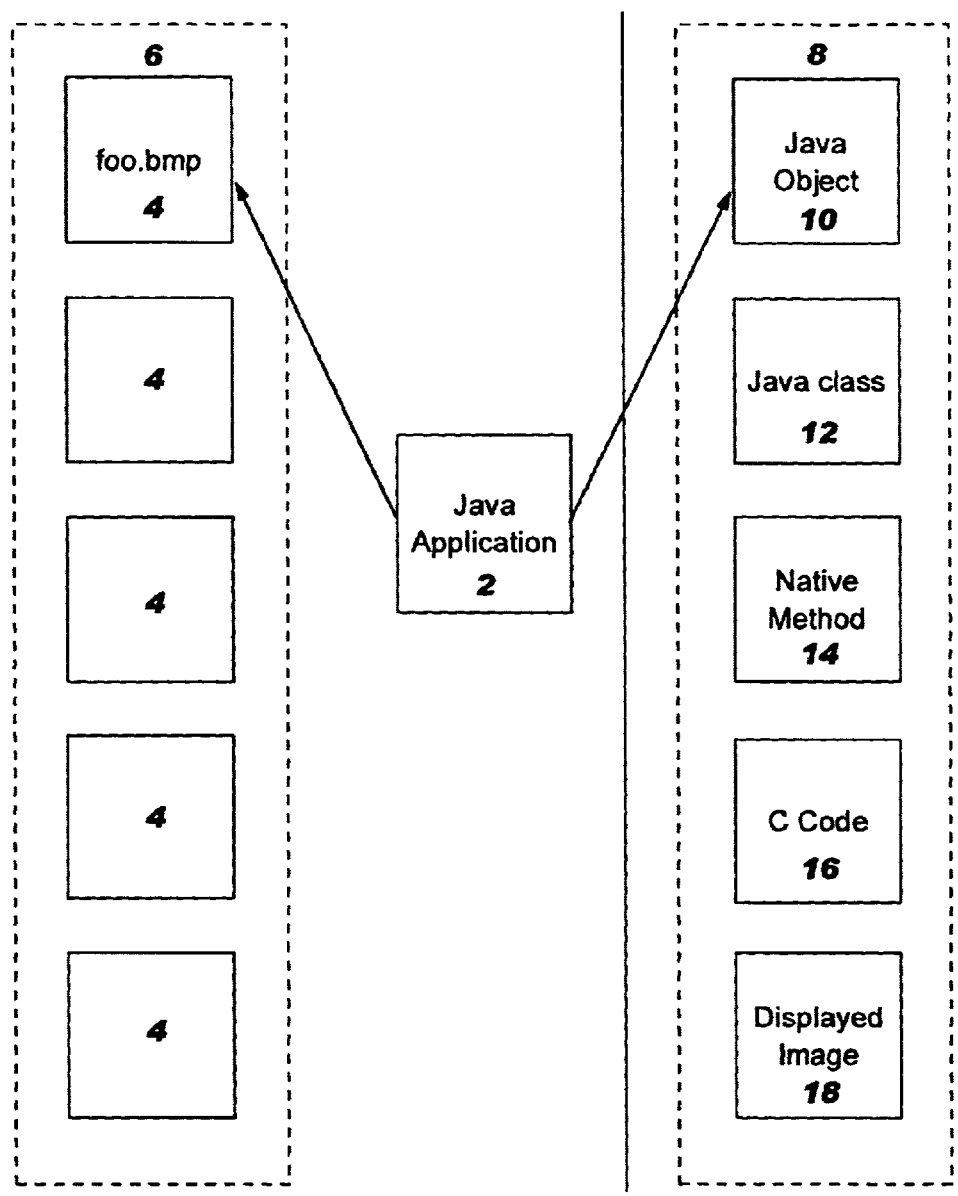
FIG. 1 is a schematic view showing the rendering of resource data stored in a flash file system, according to the prior art.

Referring to FIG. 1, a typical Java application 2 that wants to display a bitmap or use a font, would normally reference one or more bitmaps (e.g., foo.bmp) stored in files, generally designated by 4,inROM6.

The data for the resource is read by the Java application 2 from ROM 6 into a Java byte array in RAM 8, turning it into a Java object 10. The Java object 10 is passed to a Java class 12 to display it. Frequently, the resource data is not used by the Java class 12 at all, but is passed directly to C code 16 via a native method 14 in the system's Java Native Interface (JNI) to be rendered as appropriate 18. Even if it is only a reference to the Java object 10 which is passed to the Java class 12, a copy of the Java object 10 will be made at the native method 14. However, the native method 14 also does not use the copy of the Java object 10. It requests a C pointer to the byte array to discover how to write the pixels on the display screen.

When this is the case, making a copy of the data in RAM memory (the Java byte array) is completely unnecessary. The present invention eliminates the need to create a byte array of the resource data as a Java object in RAM, and to copy that data around.

The invention recognizes that resource data of this type, when used on many types of embedded systems, does not change. Thus, it is one type of data that can be stored in ROM and safely accessed directly from ROM at runtime.

Figure 2:
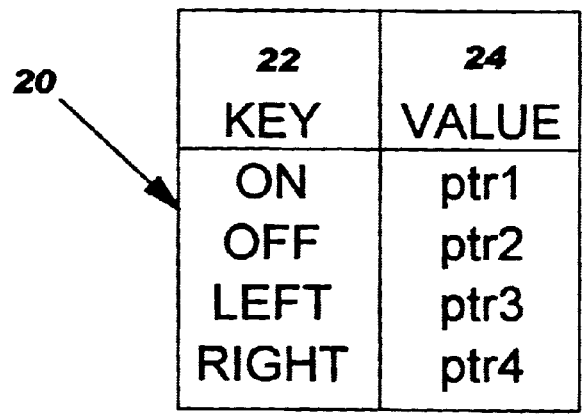
FIG. 2 is a schematic view of an array or table describing key-value pairs for accessing resource files stored in ROM, according to the invention.

Referring to FIG. 2, in the invention, each resource file is associated with a value 24 representing, but not actually reproducing, the resource data. In the preferred embodiment of the invention, this value 24 is an operating system memory pointer (e.g., OX0A000) which addresses the actual resource data (the bitmap, etc.) in ROM storage. Each pointer is associated with a key 22. The key 22 is selected by the programmer, and is generally a string which is a human-readable description of the resource data.

A number of key-value pairs are collected into an array or logical table 20 which, in the preferred embodiment, is referred to as a ROM Resource Bundle ("RRB") discussed in greater detail below. The size and number of RRBs for an application will depend upon the manner in which the programmer has partitioned the application. However, all resources used in an application that are identified in a ROM Resource Bundle are uniquely identified by the RRB they are contained in, and their key.

For example, FIG. 2 illustrates an RRB for common controls in a very simple user interface. The strings "ON" and "OFF" are respectively associated with pointers to data files containing bitmaps or GIFFs for on and off buttons for the device display. Similarly, "LEFT" and "RIGHT" are keys for pointers to bitmap data for displaying left and right scrolling arrows.

Figure 3:
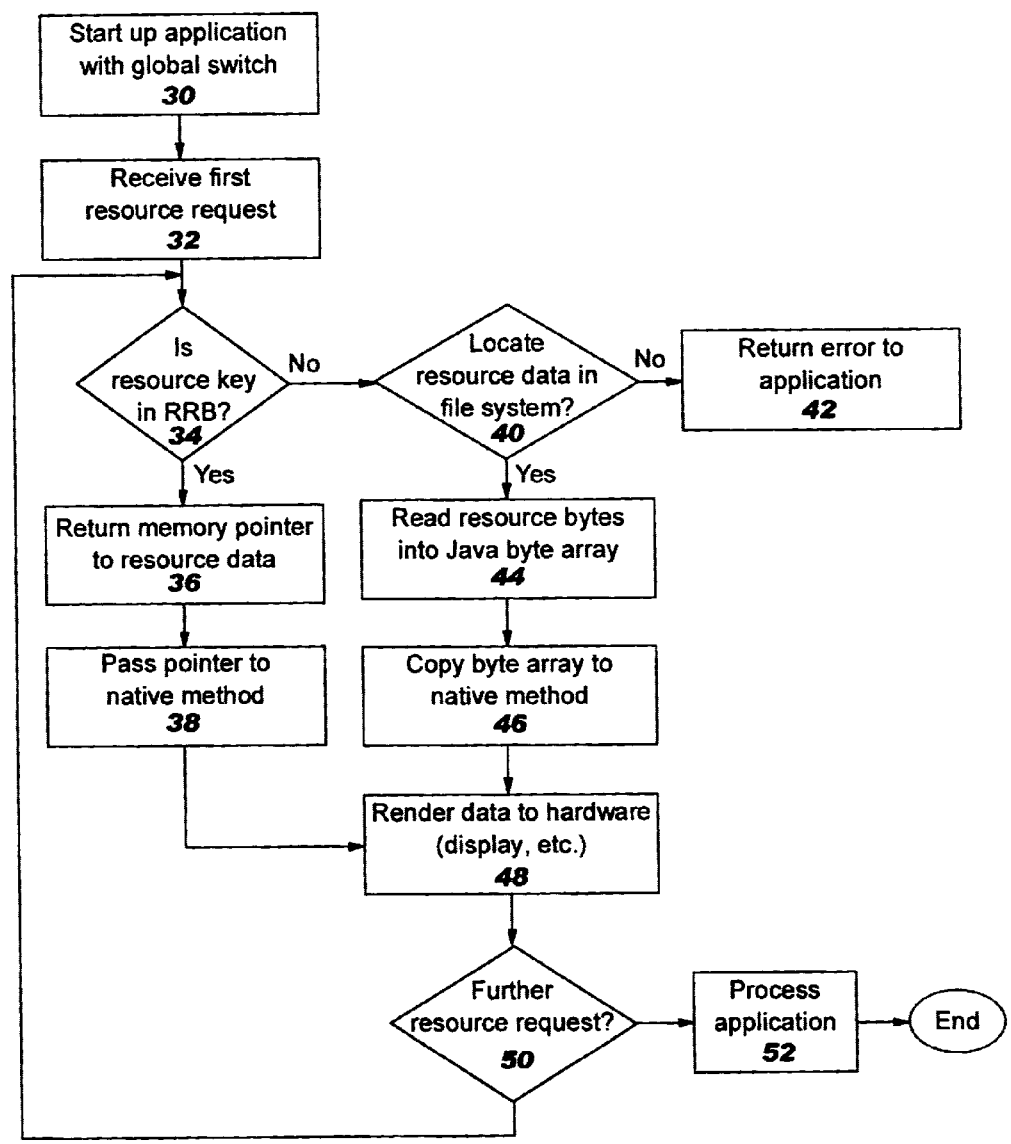
FIG. 3 is a flow diagram showing the steps for accessing resource data stored in ROM, according to the invention.

The RRB is accessed from a conventional application by including a global switch when the application is started. In response to a resource call in the application, the switch determines whether to read data out of ROM storage or dynamically, by creating an object in RAM. This is illustrated in the flow diagram of FIG. 3.

An application started up in an environment with the global switch (block 30) will process a resource request (block 32) by first looking for the resource key for the request in the RRB (block 34). The key in the RRB provides a pointer to the data in ROM storage (block 36), and the pointer is passed (copied) to the native method (block 38) to render the data (e.g., bitmap) on the hardware (block 48). If a key for the application's resource request is not located in an RRB (block 34), the application will attempt to render the resource dynamically, in the traditional manner discussed above, by reading the data bytes into a Java byte array (block 44), copying the Java byte array to a native method (block 46) to be rendered on the hardware (block 48). If no corresponding resource data exists in ROM for the program call, an error message will be returned to the application (blocks 40, 42).

All resources requested by the application are processed iteratively in this manner (block 50) until processing of the application is completed or terminated (block 52).

A preferred embodiment of the invention has been implemented in a Java programming environment. In the Java class hierarchy, there is a class called ResourceBundle which is a logical way to store related bitmaps by separating the logical description of the data with its physical location. In a conventional Java system, a Resource Bundle is an array or table in which strings are associated with actual data/files. Thus, from the FIG. 2 example, the string "ON" would be associated in the Resource Bundle with an image file called "on.gif".

In the invention, RomResourceBundle is an abstract subclass of the ResourceBundle class. Users access resources stored in ROM using an instance of RomResourceBundle. A RomResourceBundle may contain multiple resources. Each resource has a key associated with it that is a string. The value associated with the key is an instance of the class OSBytes.

The OSBytes class models operating system pointers. Instances contain pointer values (long integer) and length. Instances of this class can pass C pointer to JNI calls by passing the pointer value.

To populate a RomResourceBundle with keys and associated OSBytes objects, the getcontents( ) method is overridden. This method returns an array of arrays. The inner arrays are length 2, with the first item being the key (a String), the second item being an instance of RomResourceSpec.

The RomResourceBundleManager class provides some public and private general purpose static methods for use with RomResourceBundles.

Instances of the RomResourceSpec class are used to determine the data associated with a key in a RomResourceBundle. Instances are created by passing a Java class and a URL to this class's constructor. Once built, the data for the resource can be obtained via the following code snippet:

resClass.getResourceAsStream(resURL);

This call returns an InputStream that allows the resource data to be read. The class provides methods to read all the resource data and return it as a Java byte array.

The operation of RomResourceBundles, in the preferred embodiment, is illustrated by the following scenario.

The class EGMasksBundle is included with the IBM Embedded Samples. This class is a subclass of the RomResourceBundle class. It contains one method, with the body:

```
/**
* Answer the contents as keys and values.
*
* <p>
* © Copyright IBM Corp 1998
*
*/
public java.lang.Object[][] getContents() {
    String dirSeparator = "/";
    return new Object[][] {
        {   "black",
            new RomResourceSpec(
                getClass(),
                "Masks" + dirSeparator + "black.efrm")},
        {   "dark gray",
            new RomResourceSpec(
                getClass(),
                "Masks" + dirSeparator + "darkgray.efrm")},
        {   "gray",
            new RomResourceSpec(
                getClass(),
                "Masks" + dirSeparator + "gray.efrm")},
        {   "light gray",
            new RomResourceSpec(
                getClass(),
                "Masks" + dirSeparator + "lightgray.efrm")},
        {   "very light gray",
            new RomResourceSpec(
                getClass(),
                "Masks" + dirSeparator + "verylightgray.efrm")},
        {   "white",
            new RomResourceSpec(
                getClass(),
                "Masks" + dirSeparator + "white.efrm")}};
}
```

This RomResourceBundle describes 6 key-value pairs. For instance, the key "black" is associated with the resource associated with the EGMasksBundle class (as indicated by the getclass( ) call), and the URL Masks/black.efrm.

This URL is resolved via typical resource resolution. Since the full name of the class is com.ibm.ive.egfx.EGMasksBundle, the actual file name that contains the data is expected to be com/ibm/I've/egfx/Masks/black.efrm, found in the same class path the EGMasksBundle class was read from by the Java class loader.

The set of calls below result in returning an OSBytes instance that points to the data contained in the previously named file:

RomResourceBundle rrBundle;
OSBytes value;
rrBundle=new EGMasksBundle( );
value=rrBundle.getOSBytes("black");

To pass a pointer to this data to a JNI method, the pointer value is dereferenced:

someJniMethod(value.getPointer( ));

There are two different ways to obtain the data in ROM Resource Bundles at run-time. The first, typically used during development, is to retrieve the data from the file system (or network) via the process described above. The second, typically used in a production application, is to create an RRB file that will contain all the keys and data in an RRB before the program is run. While this file is created in RAM, it can be loaded into ROM memory, for example, of an embedded device. When the application starts up, a pointer to the location where the RRB file was loaded into memory is passed to a method in the RomResourceBundle-Manager class. This class will read the contents of the RRB and create an instance of the RomResourceBundle class. When the RRB is requested by application code, this copy will be returned, which now provides a pointer to the data which is left in ROM.

This technique allows applications to be developed which are portable to environments using either the file-based or ROM-based access method. The determination is made when the application is started, as discussed, not when the data is accessed.

Although a preferred embodiment of the invention has been described within a specific platform and in association with a specific class hierarchy, it will be understood that modifications to the invention which would be obvious to a person skilled in the art are intended to be included within the scope of the appended claims.

The embodiments of the invention in which an exclusive property or privilege is claimed are defined as follows:

1. A system for processing resource data directly from a location in read-only memory, comprising:
   at least one logical table containing a key for a program call for a resource, and associating the key with a value identifying the location in read-only memory of the resource data; and
   a mechanism for redirecting calls to the resource data to said at least one logical table.

2. The system, according to claim 1, wherein the value is a pointer to the location in read-only memory of the resource data.

3. The system, according to claim 1, wherein the key is a string.

4. In a computer system, a method for processing resource data directly from a location in read-only memory, comprising:

on start-up of the system, generating an array of key-value pairs, wherein the key in a pair is associated with a named resource and the corresponding value of the key in the pair is information for accessing the resource data at the location in read-only memory; and on start-up of a program in said system, engaging a global switch to direct program calls for resources to said array.

5. The method, according to claim 4, further comprising the steps of:

locating the value for a resource named in the program;

passing the value to a method for processing the resource data; and processing the resource data from the location in read-only memory.

6. In an interpreted object-oriented programming language environment having a manager class having a get Contents method adapted to return to random access memory (RAM) persistent data stored in read-only memory (ROM), a method for processing resource data directly from a location in ROM, comprising;

overriding the get_Contents methods;

returning an array of arrays to RAM, each inner array being two items in length, the first item being a key and the second item being an instance of a specification for resource data stored in ROM; and storing each inner array at a memory location in RAM; and passing a pointer to a method in the application manager for the memory location of each inner array.

7. A computer program product, comprising a computer usable medium having computer readable program code means embodied therein for causing a computer to process resource data directly from a location in read-only memory, the computer readable program code means in said computer program product comprising:

computer readable program code means for causing the computer, on start-up of a system in the computer, to generate an array of key-value pairs, wherein the key in the pair is associated with a named resource and the corresponding value of the key in the pair is information for accessing the resource data at the location in read-only memory; and computer readable program code means for causing the computer, on start-up of a program in said system, to engage a global switch to direct program calls for resources to said array.

* * * * *